United States Patent [19]
Johnson

[11] 3,767,291
[45] Oct. 23, 1973

[54] RETROVIEWER

[75] Inventor: Edgar G. Johnson, Maplewood, Minn.

[73] Assignee: Minnesota Mining and Manufacturing Company, St. Paul, Minn.

[22] Filed: Mar. 31, 1972

[21] Appl. No.: 240,132

[52] U.S. Cl. ............... 350/237, 350/238, 350/245, 350/103, 350/211
[51] Int. Cl. ........................................... G02b 27/02
[58] Field of Search .................. 350/3.5, 13, 103, 350/235–239, 245, 211

[56] References Cited
UNITED STATES PATENTS

| | | | |
|---|---|---|---|
| 3,552,853 | 1/1971 | Sanders | 350/3.5 |
| 2,944,463 | 7/1960 | Rantsch | 350/236 |
| 2,977,847 | 4/1961 | Meyer-Arendt | 350/13 |
| 3,182,576 | 5/1965 | Papke | 350/211 |

*Primary Examiner*—David Schonberg
*Assistant Examiner*—Michael J. Tokar
*Attorney*—Alexander, Sell, Steldt & Delahunt

[57] ABSTRACT

A retroviewer for use in verifying a document having a retro-reflective image bearing layer which is substantially transparent under ordinary diffuse light viewing conditions to provide viewing of images on an underlying surface. The viewer includes a lamp and a condensing lens mounted in a housing and in combination producing a virtual image of the light source that has an area between 0.5 sq. in. and 3 sq. in. A beam splitter is inclined to the optical axis of the lamp and condenser lens combination and it is positioned to reflect a portion of the light transmitted by the lens onto a viewing stage which supports a document to be verified. Light reflected from the beam splitter is retro-reflected from the image bearing layer of the document and a portion thereof is transmitted through the beam splitter for viewing to verify the document by its retro-reflective image.

7 Claims, 5 Drawing Figures

Patented Oct. 23, 1973

3,767,291

RETROVIEWER

FIELD OF THE INVENTION

The present invention relates to a retroviewer for viewing a retro-reflective image contained on a document in a layer which is substantially transparent under diffuse light viewing conditions.

BACKGROUND OF THE INVENTION

Counterfeiting of identification cards, passports, driver's licenses, credit cards, stock certificates and the like is a very serious problem resulting in the loss to businessmen and individuals of many millions of dollars each year. Many of these documents are easy to falsify and detection of the falsification has been nearly impossible for untrained personnel such as clerks, tellers, etc.

Recently, however, a legend containing, substantially transparent, retro-reflective sheet material has become available to the manufacturers or distributors for bonding to documents to verify the authenticity of an original document. Such sheet material is described in co-pending application Ser. No. 186,172 filed on Sept. 30, 1971, and assigned to the assignee of the present application. The sheet material is described therein as having both retro-reflective legend areas and retro-reflective background areas that are substantially transparent and indistinguishable under ordinary diffuse light viewing conditions and that are clearly distinguishable and effective opaque under retro-reflective viewing conditions inasmuch as either the background or the legend is a more efficient retro-reflector. The sheet material includes a monolayer of glass microspheres of at least 1.8 refractive index having a partially light-transmissive mirror in optical connection with the rear surfaces of the beads, the retro-reflective efficiency differing in the legend and the background areas. Under daylight conditions the sheet appears either to be free of a legend or to have only a legend too faint to obscure the visual information on the document to which it is bonded; for example, if the sheet is affixed over a photograph, the photograph remains visible to the observer, and one hardly notices the presence of the covering retro-reflective sheet or the legend thereon. Yet, when viewed along a path of collimated light, even though the entire structure is retro-reflective and the photograph is thereby obscured, the legend is made quite visible because of a difference in retro-reflective efficiency between the legend areas and the background areas of the sheet material.

The legend or image in the retro-reflective layer may be different for each manufacturer or distributor of documents. Generally, the legends are smaller than the documents to which the retro-reflective material is to be laminated and they are arranged in a repetitive pattern. Cutting of the retro-reflective image bearing sheet from a continuous roll for lamination on a document provides a random distribution of the legends or images in the retro-reflective layer thereby making tampering therewith (e.g. exchanging of photographs on driver's licenses) virtually impossible. Furthermore, duplication of the transparent retro-reflective sheet material requires expensive equipment and much technical knowhow thereby further deterring counterfeiting of the protected documents.

A document protected with the retro-reflective sheet material as described above preferably has the legends with a greater retro-reflectance than the background areas of the retro-reflective layer. Such a document has a retro-reflectivity in the background areas of the retro-reflective layer at least twice as great as can be obtained by any other known method of producing a retro-reflective legend visible against a retro-reflective background. However, until now, there has not been a viewer available which can be used by an inexperienced person to consistently detect a counterfeit document without risking false accusation and embarrassment of a customer having a properly verified document.

SUMMARY OF THE INVENTION

According to the present invention there is provided a retroviewer for use in verifying a document having a retro-reflective image bearing layer which is substantially transparent under diffuse light viewing conditions. The viewer includes a lamp and a condensing lens in a housing which combine to produce a virtual image of the light source that has an area between 0.5 sq. in. and 3 sq. in. A beam splitter inclined to the optical axis of the lens and lamp is positioned to reflect a portion of the light transmitted by the lens onto a document supported on a viewing stage and to transmit a portion of the light retro-reflected from a document on the stage. The retroviewer provides easy detection of falsified documents while at the same time substantially eliminating the possibility of considering a properly verified document to be counterfeit.

Figure 1:
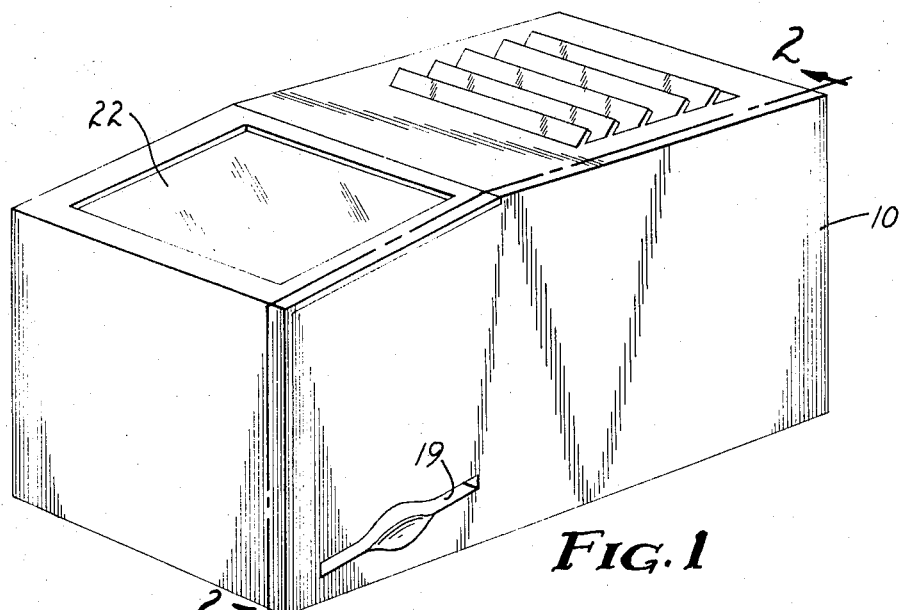
FIG. 1 is a perspective view showing the front, top and one side of a retroviewer constructed in accordance with the present invention.
Figure 2:
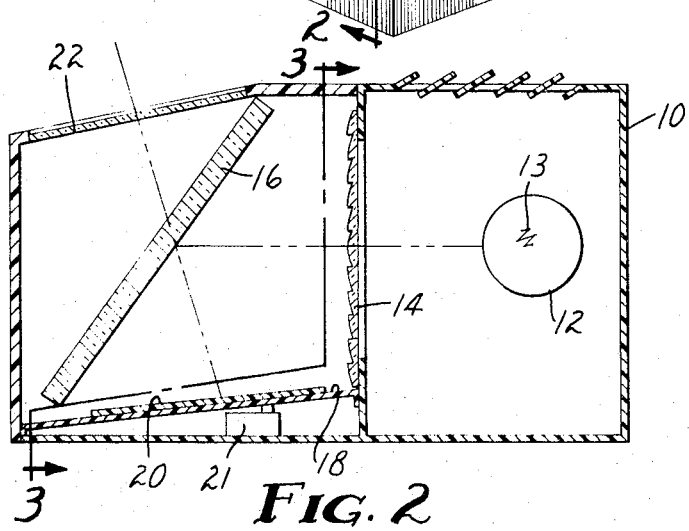
FIG. 2 is a cross-sectional view taken along line 2—2 of FIG. 1.
Figure 3:
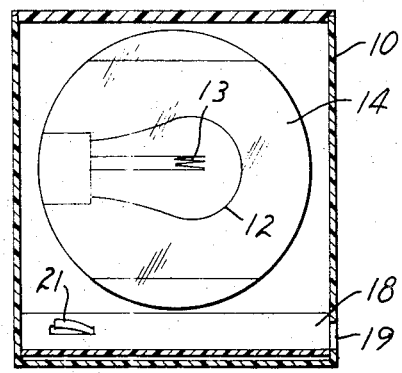
FIG. 3 is a cross-sectional view taken along line 3—3 of FIG. 2.

The retroviewer of the present invention includes a housing 10 supporting and enclosing a lamp 12, a condensing lens 14, a beam splitter 16 and the viewing stage 18. The illustrated embodiment is constructed for verification of driver's licenses which have dimensions of about 2¼ inches by 3⅜ inches. The housing 10 is formed with a narrow slot 19 in one sidewall through which a driver's license may be inserted onto the viewing stage 18.

The lamp 12 is supported centrally at the rear of the housing 10 and it has a filament 13 which forms the source of light in the retroviewer. It is mounted on the side wall of the housing to place the longest dimension of the filament 13 parallel to the length of the viewing stage 18.

The condensing lens 14 is spaced forward of the lamp 12 with its axis horizontal and passing through the center of the filament 13 of the lamp 12 to collect and transmit light from the lamp 12. The illustrated condensing lens 14 is a Fresnel lens which the housing partially shields at the top and bottom to narrow the area of the viewing stage that is illuminated. The condensing lens 14 preferably has a focal length less than 5 inches to limit its spacing from the lamp 12 and thereby to limit the necessary exterior dimension of the retroviewer housing 10.

The beam splitter 10 is supported by the housing 10 in the path of light transmitted by the condensing lens 14 and at an angle to the optical axis of the lens and lamp to reflect a portion of the light from the condensing lens onto the viewing stage 18. A portion of the light reflected from the beam splitter onto a card 20 on the viewing stage 18 is retro-reflected from the card directly back to the beam splitter and a portion thereof passes through the beam splitter 16 and through a transparent plate 22 for viewing by an operator from above the retroviewer. In the illustrated embodiment the viewing stage 18 is inclined to the horizontal 5° and the beam splitter is inclined to the horizontal 52.5° so that light will be properly retroreflected from the card 20 on the viewing stage 18 while the operator may set the retroviewer on a counter and stand slightly in front of it while viewing the retro-image on the card 20.

Figure 4:
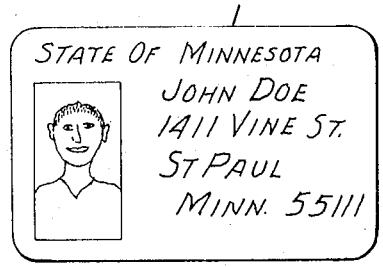
FIG. 4 is a front view of a properly validated identification card under normal diffuse light viewing conditions.
Figure 5:
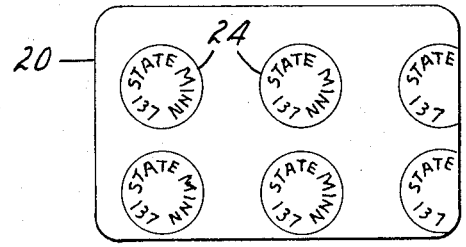
FIG. 5 is a front view of the card of FIG. 4 as it appears under retro-reflective viewing conditions in the retroviewer of FIG. 1.

The lamp 12 and the condensing lens 14 are chosen in combination to produce a virtual image of the light source (i.e. the effective image of the lamp filament in the illustrated embodiment) that has an area between 0.5 sq. in. and 3 sq. in. FIG. 4 illustrates the card 20 under normal diffuse light viewing conditions with the name, address and picture of the holder thereof for identification. FIG. 5 illustrates the retro-reflective images on the same card 20 showing the proper retro-reflective legends 24 and the proper retro-reflective background which obscures the underlying identification.

It has been found when the area of the virtual image of the light source in the retroviewer is more than about 3 sq. in. the retro-luminance of the retro-reflective layer on the card 20 is not high enough to obscure the identification images on a properly validated card. Thus, an operator might mistakenly question a person with a properly validated card. To provide even greater assurance that mistakes will not be made, an area of the virtual image of the light source of 2 sq. in. or less is preferred.

When the area of virtual image of the light source is less than about 0.5 sq. in. the retro-luminance of counterfeits of the retro-reflective layer is high enough to obscure the underlying identification images. Such a retroviewer does not adequately discriminate. Further, when the virtual image of the light source is small, the range of viewing distances from the viewing stage 18 over which the card 20 appears uniformly retro-luminous is small and the viewer cannot be comfortably used by people of different heights. This is due to the fact that uniform retro-luminance requires that the operator's line of sight to each part of the card 20 passes through the retro-image of the virtual image of the light source; and, the larger the retro-image the greater is the range of viewing distances over which such is obtained. Preferably the area of the virtual image of the light source is 0.8 sq. in. or greater to provide more than a 10-inch range of viewing distances along the optical viewing axis. The retro-image is preferably located fourteen to eighteen inches from the viewing stage 18 to permit comfortable use of the retroviewer by persons of different heights when the retroviewer is placed on a countertop.

In one specific example of the illustrated embodiment of the present invention a 30-watt BVB projector lamp 20 and a Fresnel lens 14 having a 2.0 in. (5.1 cm) focal length and a 3.0 in. (7.6 cm) diameter and shielded by the housing 0.47 in. (1.2cm) at top and bottom were spaced 1.7 in. (4.3 cm — center of lamp to principle face of lens) to provide a virtual source image area of 1.25 sq. in. With the arrangement illustrated in the drawings a clear glass beam splitter 16 with 90 percent transmittance and 9 percent reflectance at the incidence angle of 37½° was spaced from the principle face of the lens 1.7 in. (4.2 cm) along the optical axis. The viewing stage 18 was spaced 1.5 in. (3.8 cm) from the beam splitter along the reflected ray from the center of the light source. This combination produced a retro-reflected image (a real image of the virtual image of the source) at about 16 inches from the viewing stage 18 (i.e. the virtual image of the light source is also sixteen inches from the viewing stage) with a range of viewing of from about twelve inches to about twenty-four inches along the optical viewing axis. This provides comfortable viewing for different height operators. With this construction documents properly validated with the retro-reflective sheet material are easily verified without rejecting properly validated documents while at the same time providing easy discrimination of counterfeits.

In use, a card 20 is inserted into the access opening 19 in the housing 10 of the retroviewer to rest on the viewing stage 18. As the card 20 is inserted it closes a switch 21 to provide power to the lamp 12. Light from the lamp 12 passes through the condensing lens 14 and a portion thereof is reflected by the beam splitter 16 onto the card 20. Light reflected onto the card by the beam splitter 16 is retro-reflected by the legend and the background areas of the retro-reflective layer of the card. A substantial portion of the retro-reflected light is transmitted through the beam splitter 16 to the operator above and in front of the retroviewer. If the card is properly validated it will appear as in FIG. 5 with the retro-reflective legends 24 standing out from the retro-reflective background, both of which obscure the identification images therebelow.

I claim:

1. A retroviewer for use in verifying a document having a retro-reflective image bearing layer which is substantially transparent under diffuse light viewing conditions, comprising:
   a housing,
   a lamp mounted in said housing to provide a light source,
   a condensing lens positioned to collect and transmit light from said lamp,
   a viewing stage for supporting a said document to be verified,
   a beam splitter inclined to the optical axis of said lamp and lens and positioned to reflect onto said viewing stage a portion of the light transmitted by said lens and to transmit a portion of any light retro-reflected from a said document on said stage,
   said lamp and said condensing lens combining to produce a virtual image of the light source that has an area between 0.5 sq. in. and 3 sq. in.

2. A retroviewer as recited in claim 1 wherein said lamp and said condensing lens combine to produce a virtual image of the light source that is between 0.8 sq. in. and 2 sq. in.

3. A retroviewer as recited in claim 1 wherein said lamp and said condensing lens combine to produce a virtual image of the light source that is spaced from said viewing stage a distance of from 14 to 18 inches.

4. A retroviewer as recited in claim 1 wherein said condensing lens has a focal length less than 5 in.

5. A retroviewer as recited in claim 1 wherein said lamp has a filament defining said light source said lamp being positioned with the longest dimension of said filament perpendicular to the optical axis of said lamp and lens to illuminate a rectangular area on said viewing stage.

6. A retroviewer for use in verifying a document having a retro-reflective image bearing layer which is substantially transparent under diffuse light viewing conditions, comprising:

a housing, a lamp mounted in said housing to provide a light source, a condensing lens positioned to collect and transmit light from said lamp, a viewing stage for supporting a said document to be verified, a beam splitter inclined to the optical axis of said lamp and lens and positioned to reflect onto said viewing stage a portion of the light transmitted by said lens and to transmit a portion of any light retro-reflected from a said document on said stage, said lamp and said condensing lens combining to produce a virtual image of the light source sufficiently large that the line of sight to each part of a predetermined document area on said viewing stage passes through the retro-image of the virtual image of the light source over a range of distances from said viewing stage along the optical viewing axis from at least 25 percent of the retro-image to viewing stage distance below the retro-image to at least 50 percent of the retro-image to viewing stage distance above the retro-image and sufficiently small that the retro-luminance of the retro-reflective layer of a properly validated document is high enough to obscure any images underlying the retro-reflective layer.

7. A retroviewer for use in verifying a document having a retro-reflective image bearing layer which is substantially transparent under diffuse light viewing conditions, comprising:

a housing, a lamp mounted in said housing to provide a light source, a condensing lens positioned to collect and transmit light from said lamp, a viewing stage for supporting a said document to be verified, a beam splitter inclined to the optical axis of said lamp and lens and positioned to reflect onto said viewing stage a portion of the light transmitted by said lens and to transmit a portion of any light retro-reflected from a said document on said stage, said lamp and said condensing lens combining to produce a virtual image of the light source sufficiently large that the line of sight to all parts of a predetermined document area on said viewing stage pass through the retro-image of the virtual image of the light source over a range of distances along the optical viewing axis of at least ten inches and sufficiently small that the retro-luminance of the retro-reflective layer of a properly validated document is high enough to obscure any images underlying said retro-reflective layer.

* * * * *

UNITED STATES PATENT OFFICE
CERTIFICATE OF CORRECTION

Patent No. 3,767,291            Dated October 23, 1973

Inventor(s) EDGAR G. JOHNSON

It is certified that error appears in the above-identified patent and that said Letters Patent are hereby corrected as shown below:

In the Specification:

Column 1, lines 22 through 26, delete "is described in copending application S.N. 186,172 filed on September 30, 1971, and assigned to the assignee of the present application. The sheet material is described therein as having" and in its place insert --has--.

Column 1, line 30, "effective" to --effectively--

Signed and sealed this 9th day of April 1974.

(SEAL)
Attest:

EDWARD M. FLETCHER, JR.
Attesting Officer

C. MARSHALL DANN
Commissioner of Patents